Patented Oct. 16, 1945

2,387,157

UNITED STATES PATENT OFFICE 2,387,157

EMULSIFIED PETROLEUM PRODUCTS

Robert M. Koppenhoefer, Jackson Heights, N. Y., assignor to Socony-Vacuum Oil Company, Incorporated, New York, N. Y., a corporation of New York No Drawing. Application October 1, 1941, Serial No. 413,161

4 Claims. (Cl. 252—311.5)

This invention is concerned with the production of emulsions of oleaginous products in water. It is particularly concerned with the production of such emulsions which are stable in the presence of strongly electrolytic materials.

Many emulsions of oleaginous materials, as, for example, of petroleum products, are used industrially under circumstances where such stability is of major importance. Cutting oils, for example, should be capable of complete stability in contact with waters of a wide range of hardness. Of particular pertinence are wax emulsions to be used in the paper industry. While large use is made in certain paper-making processes of wax emulsions deliberately so compounded as to break and precipitate wax in the presence of alum and similar salts, etc., there also are many uses for wax emulsions where it is necessary that the wax emulsion resist breaking in the presence of these same salts. Heretofore wax emulsions of such stability have not been easily provided, and wax emulsions have been denied access to a considerable field of usefulness.

This invention has for its principal object the provision of emulsions of oleaginous products, and particularly emulsions of petroleum oils and waxes, as well as natural fatty materials, characterized by a high stability toward electrolytes, particularly toward alum, sulphates, sulphuric acid and the like, and toward hard waters.

This invention is based upon the discovery that excellent alum-salt-acid stable emulsions of oils of animal, vegetable and petroleum origin and of petroleum oils and waxes, and emulsifiable oils and waxes, may be prepared by using, as the emulsification agent, a combination of lecithin and certain sugar derivative esters of which modified mannitan mono-palmitate is representative.

The oleaginous materials which may be so emulsified comprise petroleum oils and waxes, fatty oils and greases of animal and vegetable origin, and mixtures of these. For example, petroleum fractions, petroleum waxes, oils such as neat's-foot, cod, castor, lard and sperm oils, tallow, stearine, wool grease, and the like, as well as mixtures of these, such as blends of mineral oils and fatty materials, waxes and fatty materials, and similar materials may be emulsified.

Exemplary of this invention is an emulsifiable wax, according to the following formula:

Example I

Per cent by weight

Soluble Wax:
Liquid modified mannitan palmitate____ 9.0
Lecithin _____ 9.0
120 melt point crude scale wax_____ 77.0
Water _____ 5.0

To compound this product, the palmitate, lecithin, and scale wax are heated at about 160° F. until complete solution is obtained, and then the water is added. Stirring is continued during cooling until a temperature near solidification is reached.

The product is readily soluble in water and produces a white, stable emulsion in water when used in a 1:10 ratio. The emulsion so produced is stable in the presence of 0.5% magnesium sulphate, of 0.75% alum, or of 0.075% sulphuric acid.

Oil emulsions may be similarly produced, as in the following example:

Example II

Per cent by weight

Oil emulsion:
Liquid modified mannitan palmitate____ 3.5
Lecithin _____ 3.0
Paraffin oil 80" Saybolt Universal viscosity @ 100° F._____ 40.0
Water _____ 53.5

The oil, palmitate, and lecithin are heated together to about 150° F. until complete solution is obtained, and this blend is added, with continuous stirring, to the measured amount of water, preheated to about 125° F.

The product is a white, stable emulsion showing no creaming or separation after six days.

In the following table, formulae for the preparation of emulsifiable oils of the above nature are presented. Examples of both the fatty oil and the fatty oil-mineral oil blend are presented. The blend, IV, was prepared by merely heating the various products until homogeneity was secured. The fatty oil emulsion, III, was prepared similar to the mineral oil emulsion in Example II. The following examples of the application of fatty oils for this type of emulsion may be recorded.

|  | Example III | Example IV |
|---|---|---|
| Liquid mannitan palmitate | 10 | 10 |
| Lecithin | 10 | 10 |
| #1 lard oil | 30 | 20 |
| 100 second mineral oil |  | 60 |
| Water | 50 |  |

Example III is a stable, primary emulsion, similar to Example II, which can be further diluted without breaking and which shows excellent stability in the presence of added electrolytes. Example IV is an easily emulsifiable oil which forms very stable emulsions.

The lecithin used is the usual commercial product, in the present instance the colloidal BT product as supplied by American Lecithin Company.

The particular sugar derivative employed was a modified mannitan mono-palmitate. Mannitan palmitate is typical of a fatty acid ester of the anhydride of a poly alcohol, having the following formula:

A. 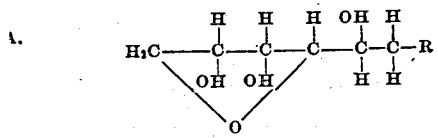

where R is the palmitate acid radical. This product can be modified to increase its water solubility through reaction with ethylene oxide at the available hydroxy groups.

Condensation of the mannitan radical with varying amounts of ethylene oxide can be used to give products of increased water solubility of the following typical form:

B. 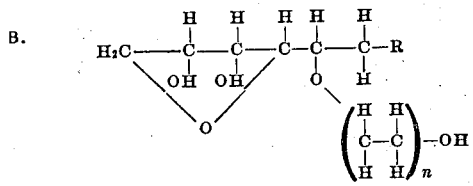

where $n$ is any number up to twenty or so and R, as before, is the fatty acid.

While the modified monopalmitate is used in the above examples, any of the higher molecular weight fatty acids such as stearic, myristic, archidic, oleic and hydroxy-stearic may be used. Any of the modified mannitan esters may be used, alone, or in admixture. In the claims, the term "esters derived from mannitan" is to be interpreted as generic, covering all such esters of formula B, while specific esters of this type with specific acids are designated as esters derived from mannitan and that acid. Two of the above examples are based on widely different hydrocarbons, one a paraffin oil of relatively low viscosity, the other a hard wax. The invention may be applied to mineral hydrocarbon products ranging from mineral oil of 30 seconds Saybolt Universal viscosity at 100° F. to mineral oils of 800 seconds S. U. V. at 100° F. and to mixtures of oils and waxes, as well as to deoiled waxes of from 90° F. melting point to 180° F. melting point. Such products are included in the term, used in the claim, "hydrocarbon materials."

Since the invention is equally applicable to animal and marine oils and greases as well as vegetable oils and waxes, these, as well as mineral hydrocarbons, are included in the term "oleaginous material."

These materials may be prepared either as emulsifiable materials, in which little or no water is present, or as emulsions.

In preparing the emulsifiable materials, each of the emulsifying components may be present in amounts ranging from about 7 per cent by weight of each, to about 20 per cent by weight of each, and the proportionate amounts of lecithin and modified mannitan ester may be varied with respect to each other within the following rule. The lecithin and modified mannitan ester should be balanced in proportion. In general, this balance does not greatly depart from about equal amounts by weight. With petroleum oils, for example, the proportions may range from about 6 parts ester to 5 parts lecithin to about 8 parts ester to 5 parts lecithin. With paraffin wax, equal weights are usually preferable. With the natural oils, greases, and waxes, similarly slight proportion variations are required to give balance, all within the requirement of about equal proportions of the two emulsifiers.

In the finished emulsions, the amount of each emulsifier, i. e., of lecithin, and of the modified mannitan ester, will range from about 2% by weight to about 20% by weight, the balance, of course, being preserved.

I claim:

1. A composition of matter capable of ready dispersion in water to form a stable aqueous emulsion comprising from about sixty percent to eighty-six percent by weight of a material selected from the group consisting of petroleum oils and petroleum waxes, from about seven percent by weight to about twenty percent by weight of lecithin and from about seven percent to about twenty percent by weight of an ester derived from mannitan and a high molecular weight fatty acid, the lecithin and ester being present in proportions ranging from substantial equality to not over eight parts ester to five parts lecithin.

2. A composition of matter capable of ready dispersion in water to form a stable aqueous emulsion comprising from about sixty percent to about eighty-six percent by weight of a material selected from the group consisting of petroleum oils and petroleum waxes, from about seven to about twenty percent by weight of lecithin and from about seven to about twenty percent by weight of an ester derived from mannitan and a palmitic acid, the lecithin and ester being present in proportions ranging from substantial equality to not over eight parts ester to five parts lecithin.

3. An aqueous wax emulsion comprising water, a petroleum wax, from about seven to about twenty percent by weight (based on wax), of lecithin, and from about seven to about twenty percent by weight (based on wax), of an ester derived from mannitan and palmitic acid, the lecithin and ester being present in proportions ranging from substantial equality to not over about eight parts ester to five parts lecithin.

4. An aqueous oil emulsion comprising water, a petroleum oil, from about seven to about twenty percent by weight (based on oil), of lecithin, and from about seven to about twenty percent by weight (based on oil), of an ester derived from mannitan and palmitic acid, the lecithin and ester being present in proportions ranging from substantial equality to not over about eight parts ester to five parts lecithin.

ROBERT M. KOPPENHOEFER.